No. 889,035. PATENTED MAY 26, 1908.
W. T. NEWSOM.
COMBINATION CANE.
APPLICATION FILED AUG. 9, 1907.
Fig. 1. Fig. 2. Fig. 6. Fig. 7.
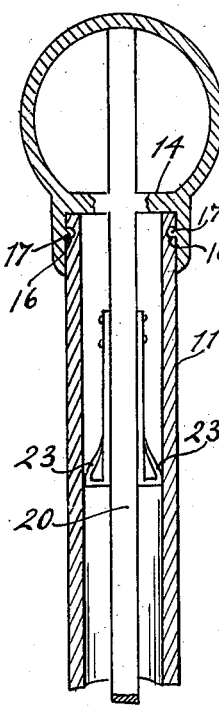
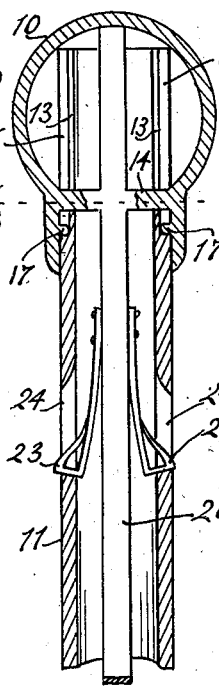
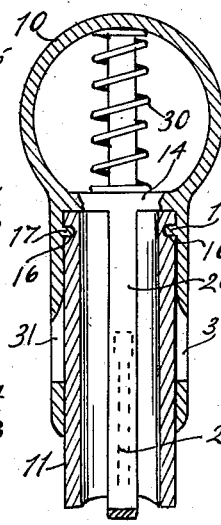
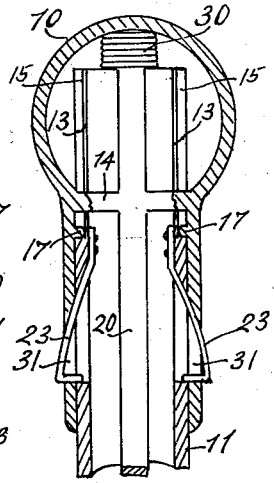
Fig. 3.
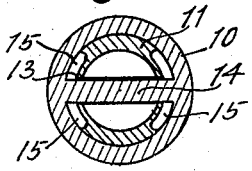
Fig. 8.
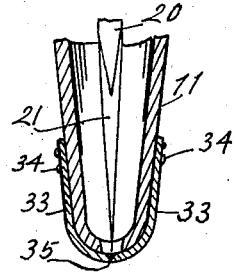
Fig. 4.
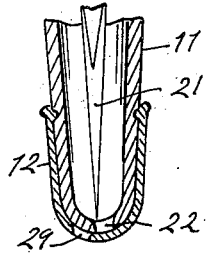
Fig. 9.
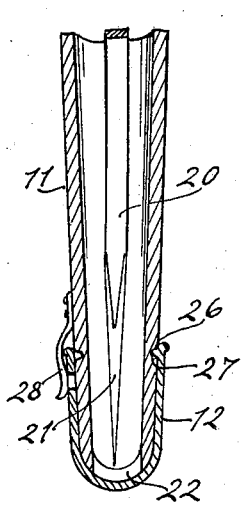
Fig. 5.
WITNESSES:
W. M. Gentle.
N. Allemong
INVENTOR.
Williamson T. Newson
BY
ATTORNEY.
THE NORRIS PETERS CO., WASHINGTON, D. C.

UNITED STATES PATENT OFFICE.

WILLIAMSON T. NEWSOM, OF COLUMBUS, INDIANA.

COMBINATION-CANE.

No. 889,035.   Specification of Letters Patent.   Patented May 26, 1908.

Application filed August 9, 1907. Serial No. 387,850.

*To all whom it may concern:*

Be it known that I, WILLIAMSON T. NEWSOM, of Columbus, county of Bartholomew, and State of Indiana, have invented a certain new and useful Combination-Cane; and I do hereby declare that the following is a full, clear, and exact description thereof, reference being had to the accompanying drawings, in which like letters refer to like parts.

The object of this invention is to construct a cane, walking stick, or similar device so as to contain a tool or implement that can be conveniently projected longitudinally out of the lower end. In this connection one idea consists in means at the upper end of the cane for manipulating the tool or implement at the lower end of the cane so as to project it or withdraw it.

Another feature of the invention consists in the construction of a ferrule so as to avoid the entrance of dirt or the like when the instrument is withdrawn into the cane or permit the projection of the instrument when desired.

The nature of the invention will be understood from the accompanying drawings and the following description and claims.

In the drawings Figure 1 is a central longitudinal section of the cane, centrally broken away, with the implement contained within the cane and the lower end closed. Fig. 2 is the same with the implement projected through the lower end of the cane. Fig. 3 is a transverse section on the line 3—3 of Fig. 2. Fig. 4 is a longitudinal section of the lower end of the cane with the tool inclosed, the other parts being in an altered position as compared with Fig. 2. Fig. 5 is a side elevation of the lower end of the tool. Figs. 6 and 7 are longitudinal sections of modified forms of the upper end of the cane. Figs. 8 and 9 are longitudinal sections of modified forms of the lower end of the cane.

The cane may be said to consist of a hollow head or handle piece 10 at the top, preferably spherical, a tubular body portion 11 below and a ferrule 12 at the lower end. The upper end of the body portion 11 slides or telescopes within the head, as shown in Figs. 2 and 3. On opposite sides of the upper end of the body portion a pair of vertical slots 13 are located through which a transverse bar 14 at the lower part of the head extends. On each side of the slots 13 there are vertical grooves 15 in the upper end of the body portion, and there is also a circular groove 16, seen in Figs. 1 and 2 into which lugs 17 project inwardly from the lower part of the head, so that the upper end of the body portion can turn in the lower part of the head, and when the two parts have been turned relatively to each other so that the lug 17 will be in line with the vertical groove 15, the upper end of the body portion of the cane can be telescoped into the head, as shown in Fig. 2.

A stem 20 is secured to the head and projects centrally through the body portion of the cane towards the lower end, and at the lower end said stem carries a tool, cutter, or any desirable implement 21. Here it is in the nature of a chisel or flat sharp-pointed instrument. Normally the point of the instrument reaches below the lower end of the body portion of the cane, as shown in Fig. 1, and there is a slot 22 in the lower end of the cane through which such implement will project when the body portion is telescoped into the head, as shown in Fig. 2. Said telescoping movement is stopped or limited by the spring stops 23 springing out into the notches 24 in the body of the cane and engaging the lower walls thereof. The slot 22 in the lower end of the body of the cane is long in one direction and narrow in the other, as shown in Figs. 1 and 2, and is so arranged that when the cane is in normal position, the tool cannot project or escape, but when the cane is turned into the position shown in Fig. 2, the slot 22 will be in alinement with the tool and permit it to protrude. In operating the form shown in Figs. 1 and 2, it is necessary for the two parts 10 and 11 to be turned relatively to each other by hand and also be telescoped by hand.

To prevent dirt entering the slot 22 of the cane, it is closed by the ferrule 12. In the form shown in Figs. 1, 2, and 4 the ferrule turns on the lower end of the cane. On its upper end there is an inwardly extending bead 26 that fits and moves in a groove 27 surrounding the cane and is held from escape by a spring catch 28 that has a tooth which enters a corresponding hole in the frame. This ferrule has a slot 29 in its lower end that registers with the slot 22 when the ferrule is turned in the position shown in Fig. 1, but does not register with it when it is in the position shown in Figs. 2 and 4, so that in one position the tool can escape and dirt cannot enter the slot.

In the modified form shown in Figs. 6 and 7 a spring 30 is employed for telescoping the head and body portion of the cane so as to withdraw the tool or implement after it has been used. In this form the device can be manipulated in the same way as that shown in Figs. 1 and 2 for projecting the tool or implement, and such manipulation will compress the spring 30. But when it is desired to withdraw the tool or implement, the springs 23 are pressed inward so as to disengage the notches 31 that are found in the lower flange-like end of the head in the form shown in Figs. 6 and 7.

The modified form of ferrule shown in Figs. 8 and 9 consists of two spring plates 33, each formed like one half of a ferrule and riveted at 34 to the side of the cane so that their lower ends will engage each other at 35 in line with the tool or implement, and, therefore, when the tool or implement is projected, it will crowd between and separate said spring plates 33. The spring plates will always engage and press against the tool, but will permit its withdrawal and will keep dirt out of the cane.

What I claim as my invention and desire to secure by Letters Patent is:

1. A cane with a tubular body portion with oppositely located slots in the upper end with grooves on each side of said slots, and peripheral notches near the lower ends of the grooves, a slot at the lower end, a head mounted on the upper end of said body portion with a transverse bar extending through the slots in the body portion and inwardly extending lugs projecting into the grooves and notches of the body portion, whereby the head may be moved up and down on the body portion, a stop to limit the downward movement thereof, a stem extending from the head through the body portion, and a tool on the lower end thereof adapted to project through the slot in the lower end of the cane when the head is telescoped on the body portion, substantially as described.

2. A cane with a tubular body portion with oppositely located slots in the upper end with grooves on each side of said slots, and peripheral notches near the lower ends of the grooves, a slot at the lower end, a head mounted on the upper end of said body portion with a transverse bar extending through the slots in the body portion and inwardly extending lugs projecting into the grooves and notches of the body portion, whereby the head may be moved up and down on the body portion, a stop to limit the downward movement thereof, a stem extending from the head through the body portion, a tool on the lower end thereof adapted to project through the slot in the lower end of the cane when the head is telescoped on the body portion, and a spring acting between the head and the body portion for returning them to their normal positions and withdrawing the tool, substantially as described.

In witness whereof, I have hereunto affixed my signature in the presence of the witnesses herein named.

WILLIAMSON T. NEWSOM.

Witnesses:
WM. CHANDLER,
THOMAS FOSTER.